US011115352B2

(12) United States Patent
Le Huerou et al.

(10) Patent No.: US 11,115,352 B2
(45) Date of Patent: Sep. 7, 2021

(54) METHOD FOR INTERACTION BETWEEN A MOBILE TERMINAL AND A COMMUNICATING AUTOMATON

(71) Applicant: Orange, Issy-les-Moulineaux (FR)

(72) Inventors: Emmanuel Le Huerou, Chatillon (FR); Francois Toutain, Chatillon (FR); Eric Beaufils, Chatillon (FR); Nathalie Begoc Becam, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/464,117

(22) PCT Filed: Nov. 22, 2017

(86) PCT No.: PCT/FR2017/053203
§ 371 (c)(1),
(2) Date: May 24, 2019

(87) PCT Pub. No.: WO2018/096261
PCT Pub. Date: May 31, 2018

(65) Prior Publication Data
US 2019/0394145 A1 Dec. 26, 2019

(30) Foreign Application Priority Data
Nov. 28, 2016 (FR) ...................... 1661592

(51) Int. Cl.
H04L 12/58 (2006.01)
H04W 4/80 (2018.01)
(Continued)

(52) U.S. Cl.
CPC .......... H04L 51/02 (2013.01); G07G 1/0009 (2013.01); H04L 51/04 (2013.01); H04L 51/18 (2013.01);
(Continued)

(58) Field of Classification Search
CPC ....... H04L 51/02; H04L 51/04; H04L 63/107; H04L 63/18; H04L 51/20; H04L 51/38;
(Continued)

(56) References Cited

U.S. PATENT DOCUMENTS

2003/0220972 A1* 11/2003 Montet .................. H04L 51/04
709/204
2006/0046712 A1 3/2006 Shamp et al.
(Continued)

FOREIGN PATENT DOCUMENTS

WO 2015187048 A1 12/2015

OTHER PUBLICATIONS

International Preliminary Report on Patentability and English translation of the Written Opinion dated May 28, 2019 for corresponding International Application No. PCT/FR2017/053203, filed Nov. 22, 2017.
(Continued)

Primary Examiner — Jungwon Chang
(74) Attorney, Agent, or Firm — David D. Brush; Westman, Champlin & Koehler, P.A.

(57) ABSTRACT

A method for interaction between a mobile terminal and a communicating automaton machine. The communicating automaton machine includes a conversational agent capable of exchanging messages with the terminal by using a first communication interface. The method includes obtaining a piece of information according to which the communicating automaton machine is in the vicinity of the terminal; inserting, in an address book of the terminal, an entry relating to the communicating automaton machine including at least the piece of information obtained; and sending at least one message capable of initializing an interaction between the terminal and the communicating automaton machine when the inserted address book entry is selected.

9 Claims, 4 Drawing Sheets

Figure 1:
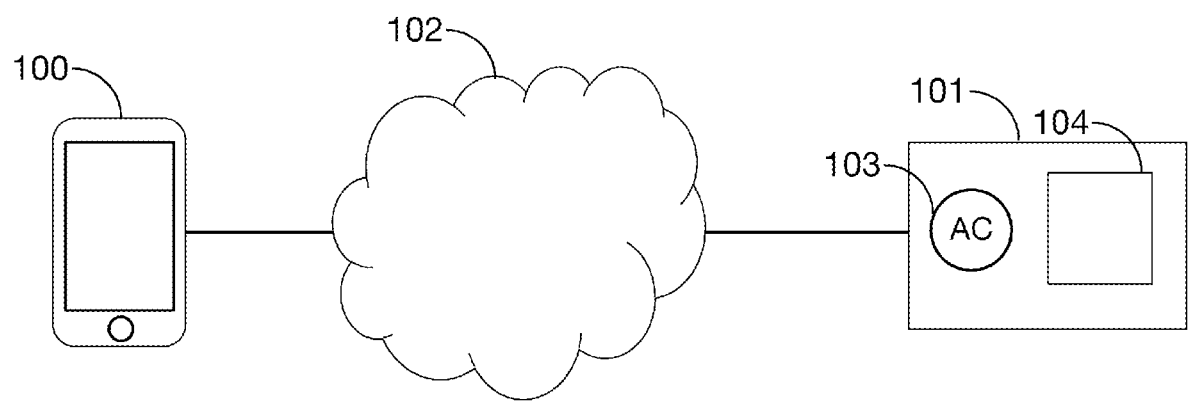

(51) Int. Cl.
  *G07G 1/00*     (2006.01)
  *H04W 4/14*     (2009.01)
  *H04W 68/00*    (2009.01)
(52) U.S. Cl.
  CPC ............ *H04W 4/14* (2013.01); *H04W 4/80* (2018.02); *H04W 68/005* (2013.01)
(58) Field of Classification Search
  CPC ... H04L 51/18; G06F 3/0484; G06Q 30/0603; G06Q 30/0205; G06Q 20/18; G06Q 20/325; H04W 4/16; H04W 4/02; H04W 4/029; H04W 4/80; H04W 4/14; H04W 68/005; G07G 1/0009
  See application file for complete search history.

(56) References Cited

U.S. PATENT DOCUMENTS

| | | | | |
|---|---|---|---|---|
| 2009/0215476 | A1* | 8/2009 | Tysowski | H04L 51/04 455/466 |
| 2013/0185081 | A1* | 7/2013 | Cheyer | B60K 35/00 704/275 |
| 2015/0088731 | A1* | 3/2015 | Ackerman | G06Q 30/0603 705/39 |
| 2015/0237207 | A1* | 8/2015 | Ordille | H04W 4/16 379/204.01 |
| 2016/0021039 | A1* | 1/2016 | Woo | H04L 12/1827 715/752 |
| 2016/0232609 | A1* | 8/2016 | Lindemulder | G06Q 20/342 |
| 2017/0076306 | A1* | 3/2017 | Snider | G06Q 30/0205 |
| 2017/0180499 | A1* | 6/2017 | Gelfenbeyn | H04L 51/02 |
| 2017/0308692 | A1* | 10/2017 | Yano | H04W 4/021 |
| 2018/0089654 | A1* | 3/2018 | Licht | G06Q 20/20 |
| 2018/0293983 | A1* | 10/2018 | Choi | G06F 3/0484 |

OTHER PUBLICATIONS

International Search Report dated Jan. 24, 2018 for corresponding International Application No. PCT/FR2017/053203, filed Nov. 22, 2017.
Written Opinion of the International Searching Authority dated Jan. 24, 2018 for corresponding International Application No. PCT/FR2017/053203, filed Nov. 22, 2017.

* cited by examiner

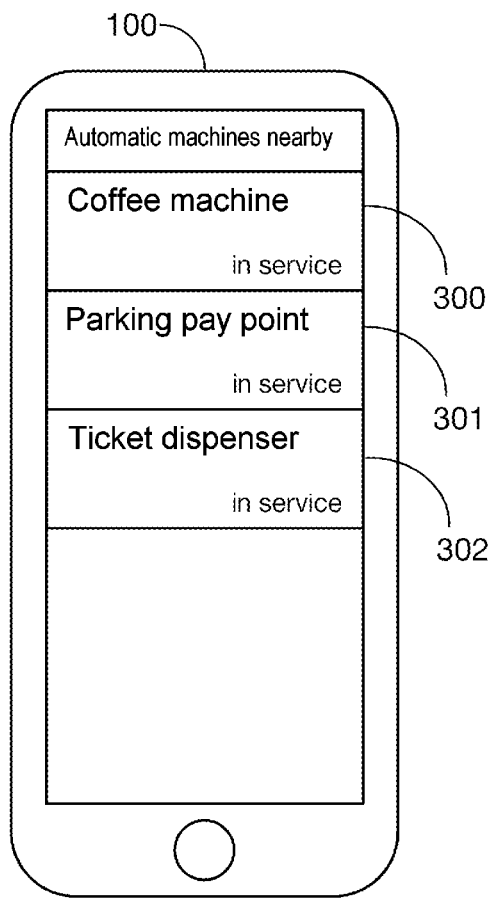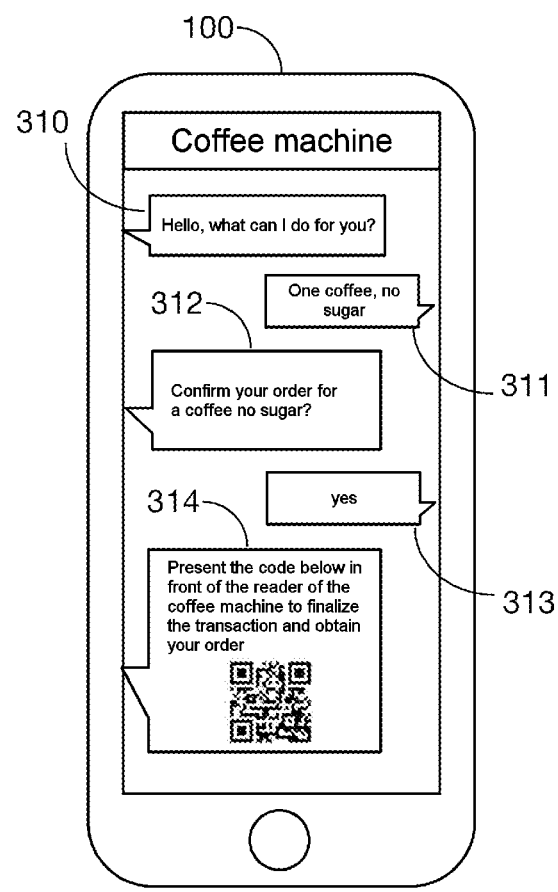
Figure 3a
Figure 3b

METHOD FOR INTERACTION BETWEEN A MOBILE TERMINAL AND A COMMUNICATING AUTOMATON

CROSS-REFERENCE TO RELATED APPLICATIONS

This Application is a Section 371 National Stage Application of International Application No. PCT/FR2017/053203, filed Nov. 22, 2017, the content of which is incorporated herein by reference in its entirety, and published as WO 2018/096261 on May 31, 2018, not in English.

TECHNICAL FIELD

The present invention relates to the field of telecommunications and relates, more particularly, to a method for interaction with a communicating automatic machine such as an automatic dispenser or teller machine.

PRIOR ART

Communications of instant messaging type have been exciting keen interest among the public for a few years now. In effect, this mode of communication offers more interactivity than a communication by electronic mail while being less intrusive than a voice call. This type of communication includes messages of SMS (Short Message Service) type or the "chat" services. The mass adoption of this mode of communication and the arrival on the market of touch screen mobile terminals has been accompanied by changes to the user interfaces facilitating this mode of communication. Thus, the user interfaces are now converging toward a conversational view in which the messages sent and the messages received are presented in bubbles arranged on either side of the screen of the terminal and ordered chronologically. With a few exceptions, this type of presentation in conversation form is predominant on most terminals and messaging applications, of all brands.

This type of communication is so overwhelmingly supported that it is now no longer reserved for exchanges between physical persons. In effect, these days it is possible to exchange messages with software robots capable of interpreting messages sent by users and of responding to them more or less relevantly. Examples that can be cited include robots specializing in weather forecasts capable of answering messages of the type "what the weather be like tomorrow in Paris?". Thus, a user has a unified interface for communicating with other users and accessing services. This type of robot capable of interacting with users by exchanging messages is sometimes called "conversational agent".

The use of this type of communication is still expanding now with the advent of "conversational commerce". Conversational commerce implements robots suitable for allowing users to place orders for goods or services. Thus, users no longer need to download a dedicated application or access a website to enter an order, and the service provider does not need to publish and maintain an application or a website.

These days, many types of automatic machines are known which are little-by-little replacing the traditional counters in banks, stations or businesses. Examples that can be cited are automatic ticket machines in stations, parking pay points, dispensers of tickets, of drinks and other snacks, coffee machines or even terminals for borrowing bicycles or shared vehicles. Some of these automatic machines are connected to a communication network in order to access databases for example. Such is the case for example with bank automatic teller machines or in-station ticket reservation terminals. These different automatic machines often have a screen and input interfaces allowing users to interact with the equipment. The elements of interaction with the user have to be particularly robust in order to withstand a sometimes intense use and acts of vandalism which could degrade the apparatus.

The user interfaces on this kind of equipment are extremely heterogeneous and are sometimes confusing for the user. Such confusion can increase the time spent by a user in making a purchase and cause queues.

There is therefore a need to optimize the use of such automatic machines.

SUMMARY OF THE INVENTION

To this end, the invention relates to a method for interaction between a mobile terminal and a communicating automatic machine, the communicating automatic machine comprising a conversational agent suitable for exchanging messages with the terminal through a first communication interface, the method being characterized in that it comprises:
  obtaining of an item of information according to which the communicating automatic machine is in proximity to the terminal,
  insertion, into an address book of the terminal, of an entry relating to said communicating automatic machine comprising at least said item of information obtained, and
  sending of at least one message suitable for initializing an interaction between the terminal and the communicating automatic machine when the entry in the address book inserted is selected.

An interaction is understood to be the exchange of one or more messages between the terminal and the communicating automatic machine. An interaction is an exchange of particular messages in that it provokes a change of internal state of the automatic machine and/or of the terminal. For example, an interaction between a terminal and a communicating automatic machine can provoke the modification of an internal database of the automatic machine or indeed the modification of a stock of products associated with the automatic machine.

The method thus makes it possible to construct a list of the communicating automatic machines nearby, proposed to the user for example in the form of an address book comprising an entry for each of the automatic machines nearby. A user of the terminal can then select an entry and exchange messages to interact with the selected automatic machine. In this way, a user has a unified interface for interacting with automatic machines such as ticket or drink dispensers, parking pay points, or any other type of automatic counter. A user can thus select a drinks dispenser nearby, order a drink by exchanging suitable messages, before actually taking the drink from the dispenser.

In the context of this description, a conversational agent is understood to be an automatic machine suitable for automatically responding to messages sent by a user. Such a conversational agent is in particular suitable for interpreting commands or key words included in messages that it receives. In particular, such a conversational agent can be configured to allow a user to perform a transaction by exchanging messages from an instant messaging service. Such conversational agents are generally implemented by computer programs run on computers having communication interfaces suitable for receiving and sending instant messages, such as SMS, MMS or other types of messages conforming to the RCS standard.

Such a conversational agent included in the automatic machine allows the user to interact with the automatic machine by exchanging text messages in natural language. Thus, the invention provides an interface that is unified and controlled by the users to interact with self-service terminals and other automatic machines.

Thus, with the interaction taking place on the terminal of the user according to modalities that he or she controls, the queues at the self-service terminals are thereby reduced.

According to a particular embodiment, the method is such that the insertion into the address book is conditioned by at least one filtering rule configured previously.

The method comprises a filtering step making it possible to select the type or types of automatic machines that can be inserted into the address book of the terminal. For example, a user can configure a filtering rule that makes it possible to prohibit the insertion of certain types of automatic machines, such as snack dispensers for example.

According to a particular embodiment of the invention, the method is such that the interaction between the terminal and the communicating automatic machine is a transaction performed via an instant messaging protocol.

The method according to the invention thus makes it possible to make a purchase at an automatic machine from a mobile terminal. The transaction is performed by exchanging messages conforming to an instant messaging protocol. Such a mode of communication is well known to users and makes it possible to easily interact with an automatic machine through a unified interface. When the transaction is performed, the user can obtain the product or the service bought at the automatic machine in a shorter time. Such a transaction may be performed only partly. For example, a user can begin the order for a train ticket while queueing and continue the order when the automatic machine is free. The result thereof is a significant time saving for the user and better efficiency of the automatic machine.

According to a particular embodiment, the method is such that it further comprises a step of confirmation of the interaction by an action of a user of the terminal on the communicating automatic machine.

Such a confirmation step makes it possible to ensure that only the user having performed the transaction can obtain the product or the service from the automatic machine. For that, once the transaction has been performed from the terminal, the user confirms that he or she is indeed the author of this transaction by an interaction on the automatic machine. For example, after having selected the nearest automatic teller machine and ordered the withdrawal of a sum of cash by exchanging suitable messages with this equipment, a user confirms this order on the automatic teller in order to obtain the requested cash. The method thus makes it possible to secure the withdrawal of cash.

According to a particular embodiment of the invention, the method is such that the confirmation step comprises the exchange of a validation datum by optical reading or NFC.

A user of the terminal can thus confirm the actions performed from the terminal when he or she standing in front of the automatic machine with which he or she has interacted. The confirmation is made by the exchange of a validation datum between the terminal and the automatic machine. The datum can be exchanged by optical reading method, such as, for example, the reading of a bar code or of a two-dimensional code. The datum can also be exchanged by NFC (Near Field Communication). Such communication devices are short range. In this way, the transaction can be confirmed only when the user of the terminal is in immediate proximity to the automatic machine. A third party cannot therefore steal a product ordered by the user of the terminal.

According to a particular embodiment, the method is such that the item of information according to which the communicating automatic machine is in proximity to the terminal is obtained by a detection of the equipment within range of a communication interface of the terminal.

The terminal detects the automatic machines within range of a communication interface. For example, the terminal can obtain an item of information according to which a communicating automatic machine is in proximity by the reception of a discovery message sent by the automatic machine over a wireless network to which the terminal and the automatic machine are connected. Such a provision makes it possible to avoid the use of a server storing the location of each of the items of equipment and/or of a geolocation module on the terminal. In this way, the absolute location of the automatic machines does not need to be known and the latter can be moved without requiring any particular configuration.

According to a particular embodiment, the method is such that the item of information according to which the communicating automatic machine is in proximity to the terminal is obtained by the reception of a first message sent by the automatic machine, the message being sent when the terminal is within range of a communication interface of the automatic machine.

In this way, the automatic machine performs the detection of the terminals nearby, for example from a discovery message sent by the terminal over a wireless network to which the terminal and the automatic machine are connected. The automatic machine then sends a message to the terminal in order to inform it of its presence. Such a provision makes it possible to avoid the use of a server storing the location of each of the items of equipment and/or of a geolocation module on the terminal. In this way, the absolute location of the automatic machines does not need to be known and the latter can be moved without requiring any particular configuration. Also, the detection being at the initiative of the automatic machine, the terminal does not need to permanently search for the automatic machines nearby. The method thus makes it possible to optimize the energy consumption of the terminal.

According to a particular embodiment, the method is such that the reception of an item of information according to which at least one communicating automatic machine is in proximity to the terminal provokes a notification on the terminal.

The user is alerted by a notification when a communicating automatic machine is detected nearby. It can be a message displayed on the screen of the terminal, such as a promotional message, associated or not with a vibration, a sound or any other event likely to attract the attention of the user to the presence of such an automatic machine. The user is thus prompted to use his or her terminal to perform at least a part of an interaction with the automatic machine. As a variant, such a notification is sent only when a communicating automatic machine is inserted into an address book of the terminal. In this way, the user is not disturbed by notifications concerning types of automatic machines for which a filtering rule has been configured.

According to another aspect, the invention relates to a device for interaction between a mobile terminal and a communicating automatic machine, the communicating automatic machine comprising a conversational agent suitable for exchanging messages with the device through a first communication interface, the device being such that it comprises:

an obtaining module suitable for obtaining an item of information according to which the communicating automatic machine is in proximity to the terminal, a module for inserting, into an address book of the terminal, an entry relating to said communicating automatic machine comprising at least said item of information received, a communication module suitable for sending at least one message suitable for initializing an interaction between the terminal and the communicating automatic machine when the entry in the address book inserted is selected.

According to a particular embodiment, the invention relates to a terminal comprising an interaction device as described above.

In a particular embodiment, the different steps of the method according to the invention are determined by computer program instructions.

Consequently, the invention also targets a computer program comprising instructions for the execution of the steps of the interaction method, when said program is run by a processor.

Such a program can use any programming language and be in the form of source code, object code, or code intermediate between source code and object code, such as in a partially compiled form, or in any other desirable form.

Finally, the invention relates to a processor-readable information medium on which is stored a computer program comprising instructions for the execution of the steps of the interaction method.

The information medium can be any entity or device capable of storing the program. For example, the medium can comprise a storage means, such as a ROM, for example a CD ROM or a microelectronic circuit ROM, or indeed a magnetic storage means, for example a diskette (floppy disk) or a hard disk. Also, the information medium can be a transmissible medium such as an electrical or optical signal, which can be routed via an electrical or optical cable, wirelessly or by other means. The program according to the invention can in particular be downloaded over a network of Internet type. Alternatively, the information medium can be an integrated circuit in which the program is incorporated, the circuit being adapted to execute or to be used in the execution of the method concerned.

The abovementioned different embodiments or features can be added independently or in combination with one another to the steps of the interaction method as defined above.

The terminals, devices and programs offer at least advantages similar to those conferred by the corresponding interaction method.

LIST OF FIGURES

Figure 2:
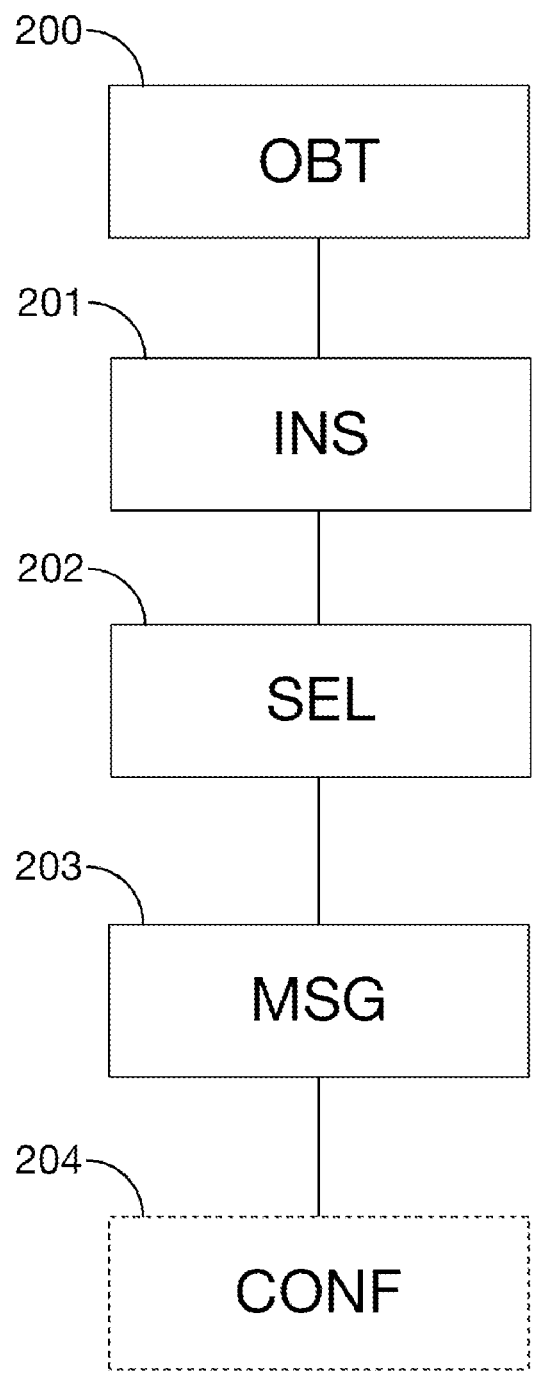
Figure 4:
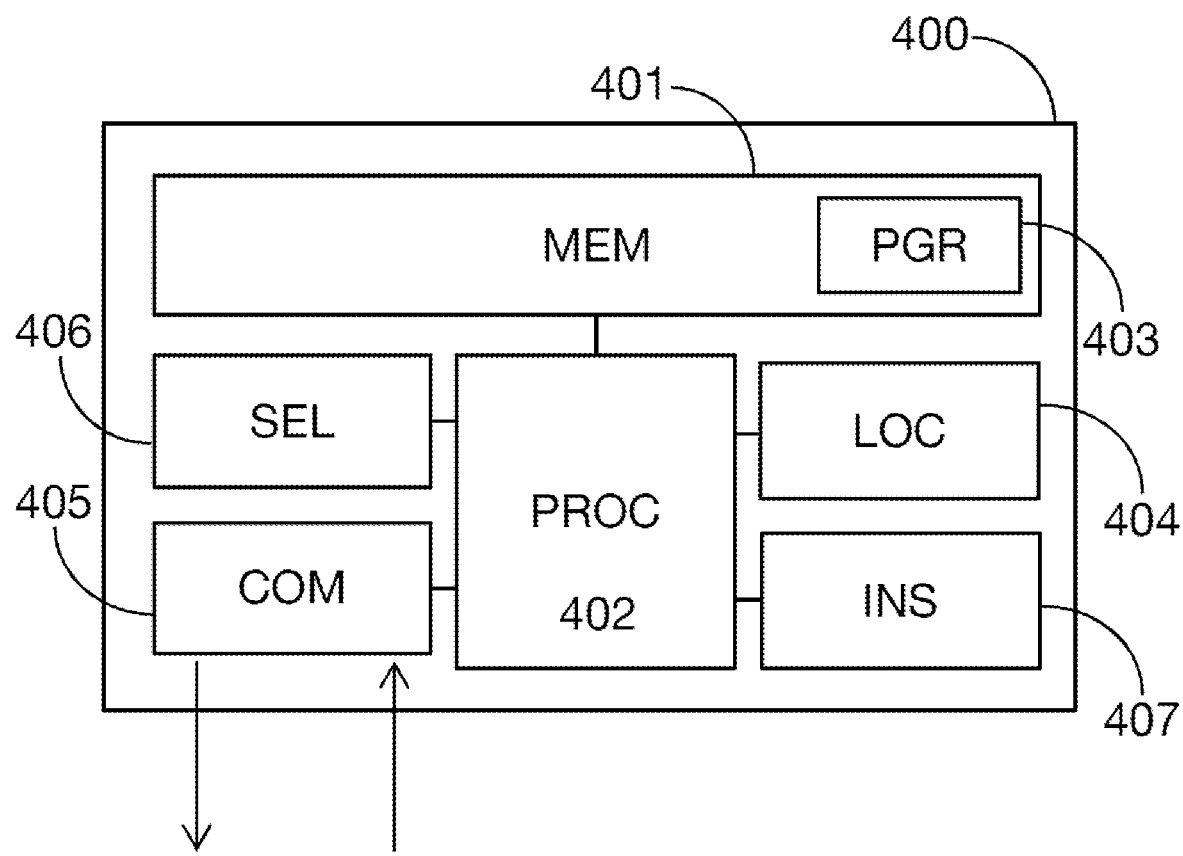

Other features and advantages of the invention will become more clearly apparent on reading the following description of a particular embodiment, given as a simple illustrative and nonlimiting example, and the attached drawings, in which:

FIG. 1 illustrates a network architecture suitable for the implementation of the invention according to a particular embodiment, FIG. 2 illustrates, in the form of a diagram, the main steps of the interaction method according to a particular embodiment of the invention, and FIG. 3a represents, according to a particular embodiment, an example of display of an address book according to the invention in which entries are inserted that correspond to connected automatic machines nearby, FIG. 3b represents messages exchanged between a communicating automatic machine and a terminal to make an order, according to a particular embodiment of the invention, FIG. 4 represents the simplified architecture of an interaction device according to a particular embodiment.

DETAILED DESCRIPTION

FIG. 1 illustrates an architecture suitable for implementing the interaction method according to a particular embodiment of the invention. Such an architecture comprises a communication terminal 100 configured to communicate through a communication network 102 with a communicating automatic machine 101. The communication network is for example a wireless network of WiFi type or any other type of wireless network, such as a Bluetooth network, or indeed a cellular network.

The communicating automatic machine 101 is for example a coffee machine comprising a conversational agent 103 suitable for sending and receiving messages conforming to an instant messaging protocol via a communication interface such as a WiFi interface or a cellular network interface. For example, the coffee machine 101 can receive SMSs sent by the terminal 100 and send SMSs to the terminal 100. The coffee machine 101 further comprises a short range communication device suitable for exchanging a datum with the terminal when the latter is in immediate proximity to the automatic machine. It can be, for example, an optical communication device 104, such as a reader or a displayer of bar codes or of two-dimensional codes, or indeed an NFC communication device.

FIG. 2 illustrates the main steps of the interaction method according to a particular embodiment of the invention.

In a first step 200, the terminal obtains an item of information according to which a communicating automatic machine is nearby.

For that, the terminal can obtain its geographic position from a GPS (Global Positioning System) module or by a GSM or WiFi triangulation method, or by any other geolocation means. The terminal can then send a request to a server having a database in which are stored the geographic locations of communicating automatic machines such as self-service terminals, automatic tellers or other dispensers. The server can then interrogate the database in order to obtain the automatic machines nearby and send a response to the terminal. Such an exchange can be performed by means of an http request sent via a network interface of the terminal. In this way, the terminal obtains a list of the communicating automatic machines nearby.

The request sent by the terminal can further comprise a distance criterion from which the server performs the search for the automatic machines nearby. More generally, the request can also comprise a context of the terminal allowing the server to determine the equipment in proximity to the terminal. Such a context can comprise, for example, a geographic position, a speed of movement or indeed a locomotion mode. Thus, the server can determine the equipment close to the terminal from its current and future position.

The request sent by the terminal can also comprise a filtering criterion relating to a particular category of automatic machines. In this way, the terminal can prevent automatic machines from signaling their presence when they do not belong to a category of equipment indicated in the request. Such a provision makes it possible to prevent the list of the communicating automatic machines detected from including entries deemed useless to the user and improves the visibility of the automatic machines likely to be useful to the user.

The item of information obtained by the terminal according to which a communicating automatic machine is nearby comprises a communication identifier of the automatic machine, such as telephone number in E.164 format, an SIP URI (Uniform Resource Identifier), or any other identifier making it possible to set up a communication between the terminal and the automatic machine, and in particular exchange instant messages. The item of information can also comprise a description of the services offered by the automatic machine, one or more service presentation images, a list of key words and/or of expressions accepted by the automatic machine, time bands of operation or any other descriptive information.

According to a particular embodiment of the invention, the item of information according to which the communicating automatic machine is in proximity to the terminal is obtained by a detection of the equipment within range of a communication interface of the terminal.

The detection of a communicating automatic machine is performed by the terminal. For that, the terminal can intercept a discovery message broadcast by a communicating automatic machine. For example, the coffee machine 101 can regularly broadcast over a WiFi network a message signaling its presence, the message comprising a description of the service offered by the automatic machine and contact details of the automatic machine. Such a message can for example be a message conforming to the SSDP (Simple Service Discovery Protocol) protocol allowing clients to discover services available on a network. Other protocols allowing services or devices to announce their presence on a network can be used. For example, iBeacon beacons or Bluetooth systems can be incorporated in automatic machines in order for them to be able to announce their presence. Since the range of a WiFi network is limited, the communicating automatic machines detected on the network are generally nearby. Such a provision does not require a centralized server to be put in place that has information on the location of the different automatic machines. Thus, an automatic machine can be moved without any particular detail concerning its location being necessary.

According to a particular embodiment, the item of information according to which the communicating automatic machine is in proximity to the terminal is obtained by the reception of a first message sent by the automatic machine, the message being sent when the terminal is within range of a communication interface of the automatic machine.

A terminal according to the invention is detected by the automatic machine. For that, the terminal can send, through a wireless communication interface, a discovery message of the type described previously. When such a message is intercepted by an automatic machine within range of the network to which the wireless communication interface of the terminal is connected, the terminal can intercept this message. Such a message comprises indications allowing an automatic machine to declare itself available to the terminal, such as, for example, a communication identifier of the terminal such as telephone number, an SIP contact address or any other identifier allowing the automatic machine to exchange data with the terminal. The message sent by the terminal can also comprise one or more filtering criteria preventing, for example, an automatic machine from signaling its presence.

In the step 201, at least one entry relating to a communicating automatic machine is inserted into an address book of the terminal, the entry comprising at least the item of information received in the step 200.

The terminal 100 comprises a list of the automatic machines detected nearby. FIG. 3a represents, according to a particular embodiment, a display of such a list of automatic machines detected on the screen of the terminal 100. The list comprises, in this example, three entries 300, 301 and 302 corresponding respectively to a coffee machine 300, a parking pay point 301 and a bank automatic teller machine 302. In this example, each of the entries comprises the name of the equipment and a status indicating its availability. These items of information are for example included in the item of information according to which a communicating automatic machine is nearby, obtained in the step 200. Each of the entries can show different items of information supplied by the corresponding automatic machine such as, for example, an image, a promotional message, a waiting time or any other information useful to the presentation of the service offered by the automatic machine.

According to a particular embodiment of the invention, the entries corresponding to the automatic machines detected are inserted into an address book of the terminal. The list represented in FIG. 3a then corresponds to a view of an address book. In this way, the automatic machines that are available are easily accessible to the user.

According to a particular embodiment, the reception of the item of information according to which at least one communicating automatic machine is in proximity to the terminal provokes a notification on the terminal.

In this way, the user is alerted when a new automatic machine is nearby and available for an interaction. The notification can, for example, be visual, vibratory or audio. For that, the terminal has an audio rendering device, a screen or a vibrator. Thus, when an automatic machine is detected, a command suitable for provoking the activation of at least one of the notification devices of the terminal is executed in order to attract the attention of the user of the terminal.

According to a particular embodiment, the insertion into the address book is conditioned by at least one filtering rule configured previously.

The user configures filtering rules in order to avoid having too many automatic machines inserted into the address book or into the list of the automatic machines detected. For that, the terminal comprises a configuration interface through which the user can select categories of automatic machines that should or should not be inserted into the address book. The configuration can then be stored in a memory of the terminal or a database. For example, the terminal 100 can be configured to not insert entries corresponding to snack dispensers. For that, the terminal 100 determines the type of automatic machine 101 from the item of information according to which an automatic machine is nearby obtained in the step 200 and compares this type of automatic machine with the stored configuration, before determining whether the automatic machine can be inserted into the address book or the list.

According to a particular embodiment, a filtering rule can be determined from data obtained from sensors of the terminal, such as, for example, a compass, an accelerometer or a gyroscope. Thus, when several communicating automatic machines are in proximity to the terminal of the user, the invention makes it possible, for example, to insert into the list only the automatic machines toward which the user is pointing the terminal. For that, the terminal obtains its position and a direction from the data obtained from sensors. The position and the direction make it possible to define a sector. The automatic machines which are not located in this sector are then disregarded and do not appear in the list displayed on the screen of the terminal. According to another embodiment, the data obtained from such sensors are used to highlight, in the list of the automatic machines detected, the automatic machines that are pointed to by the terminal. In this way, when the user is for example in a station in which there are several automatic counters, the user can designate a particular counter by pointing his or her terminal toward this counter. The list of the automatic machines nearby is then updated so as to highlight or retain only the designated automatic machine.

In step 202, an entry in the address book is selected by the user.

The user can select an entry in the list corresponding to an automatic machine detected nearby, in order to set up a communication with the automatic machine. Preferably, it is a communication set up according to an instant messaging protocol, such as an SMS or RCS (Rich Communication Suite) communication. The selection can be made by contact on a touch screen of the terminal or using a suitable selection device.

In step 203, at least one message suitable for initializing an interaction between the terminal and the communicating automatic machine is sent.

Such a message can be a message conforming to an instant messaging protocol comprising an item of information according to which the terminal wants to initiate an interaction with the automatic machine. According to a particular embodiment, the message can be a message according to a communication protocol such as TCP/IP and comprise an indication relating to the desire of the terminal to initiate an interaction. In response to such a message, an automatic machine can send a message conforming to an instant messaging protocol prompting the user of the terminal to start an interaction.

FIG. 3b illustrates the terminal 100 after the user has selected the entry 300 represented in FIG. 3a. The screen of the terminal displays messages exchanged in the context of an interaction between the terminal 100 and the coffee machine 101. In response to the message suitable for initializing an interaction between the terminal and the communicating object sent by the terminal 100, the communicating coffee machine 101 has sent a message 310 to the terminal. The message 310 prompts the user of the terminal to place a drinks order. Such a message can also comprise information relating to the different choices offered to the user, to current promotions or an aid relating to the key words and expressions that the coffee machine can interpret. According to a particular embodiment, the message 310 comprises an item of information relating to the state of operation of the automatic machine. For example, such an item of information can concern time bands of operation or a stock report. This item of information can for example be displayed in association with an entry corresponding to an automatic machine in the list of the automatic machines detected nearby.

According to a particular embodiment, the interaction between the terminal and the communicating automatic machine is a transaction performed via an instant messaging protocol.

The transaction can be a reservation, a purchase, a rental or indeed, for example, a payment. A transaction is a particular interaction in that it comprises a series of steps which switch the automatic machine or a database associated with the automatic machine from a first state prior to the transaction to a second state after the transaction. A transaction between the terminal 100 and the coffee machine 101 is, for example, the order for a drink made from the terminal by an exchange of messages between the terminal and the automatic machine.

For example, the messages 311 to 314 represented in FIG. 3b allow a transaction concerning the ordering of a coffee to be performed.

Preferably, the transaction is implemented by the exchange of messages conforming to an instant messaging protocol, but the invention is not limited to just these exchanges of instant messages. According to a particular embodiment, the messages are messages conforming to an IP transmission protocol and comprise voice commands. In this way, a user of the terminal can interact with an automatic machine by speaking commands into a microphone of the terminal. These commands can then be compressed and transmitted to the automatic machine 100. The responses from the automatic machine can also be transmitted in the form of compressed audio data or of voice commands which will be rendered through a loudspeaker of the terminal. The user can then interact with an automatic machine by simply putting his or her telephone to his or her ear.

According to a particular embodiment of the invention, the method further comprises a step 204 of confirmation of the interaction by an action of a user of the terminal on the communicating automatic machine.

An action must be performed on the automatic machine in order to confirm the current transaction or interaction between a terminal and a communicating automatic machine. The confirmation authorizes in particular the delivery of a product or of a service that is the subject of the transaction. For example, the confirmation makes it possible to open parking lot barriers, to deliver a purchased product, or to take account of a reservation. For example, the user may have to enter on the automatic machine a validation datum such as a confirmation code displayed on the terminal. In this way, only the holder of the terminal can obtain a service or a product ordered via the interaction method. For that, the automatic machine 101 can generate a validation datum such as an order number or a code, store this datum in association with the current interaction and/or the terminal concerned, and transmit this validation datum to the terminal 100 in a message. To obtain the order, the user of the terminal 100 enters the validation datum received on an interface of the automatic machine 101. The automatic machine then compares the datum entered with the data generated and stored previously. When a match is found, the automatic machine can terminate the transaction and for example deliver an ordered product. Such a provision makes it possible to secure transactions.

According to a particular embodiment, the confirmation step comprises the exchange of a validation datum by optical reading or NFC.

The validation datum can advantageously be exchanged with the terminal via a short range transmission channel, such as, for example, an optical transmission in the air. For example, the validation datum can be a graphic code such as a bar code or a two-dimensional code. The message 314 of FIG. 3b illustrates a two-dimensional code. To confirm the order, the graphic code displayed on the terminal is presented in front of a suitable reader of the automatic machine.

Thus, the interaction can be confirmed reliably and rapidly. As a variant, the validation datum can be exchanged by a communication interface of NFC (Near Field Communication) type. For that, the terminal and the automatic machine comprise an NFC communication device through which the validation datum is transmitted when the devices are within range of one another. In this way, the method secures the delivery by the automatic machine of the product or of the service.

FIG. 4 illustrates, according to a particular embodiment of the invention, a device 400 implementing the interaction method.

The device comprises a storage space 401, for example a memory MEM, and a processing unit 402 equipped for example with a processor PROC. The processing unit can be driven by a program 403, for example a computer program PGR, implementing the interaction method as described in the invention with reference to FIG. 2, and in particular the steps of obtaining of an item of information according to which the communicating automatic machine is in proximity to the terminal, of insertion, into an address book of the terminal, of an entry relating to said communicating automatic machine comprising at least said item of information obtained, and of sending of at least one message suitable for initializing an interaction between the terminal and the communicating automatic machine when the entry in the address book inserted is selected.

On initialization, the instructions of the computer program 403 are for example loaded into a RAM (Random Access Memory) memory before being executed by the processor of the processing unit 402. The processor of the processing unit 402 implements the steps of the interaction method according to the instructions of the computer program 403.

For that, in addition to the memory 401 and the processor 402, the device comprises an obtaining module 404 suitable for obtaining an item of information according to which the communicating automatic machine is in proximity to the terminal. Such a module can be implemented by a computer program comprising instructions that can be executed by a processor and suitable for determining that an automatic machine is nearby. The computer program can comprise instructions configured to receive, via a wireless communication module of the terminal, a discovery message originating from an automatic machine connected to the same wireless network as the terminal. According to a particular embodiment, the location module comprises a GPS geolocation component suitable for determining the position of the terminal. The location module then comprises computer program instructions for transmitting the position of the terminal to a server and receiving, from the server, a list of communicating automatic machines nearby.

The device 400 also comprises a module 407 for inserting, into an address book of the terminal, an entry relating to said communicating automatic machine comprising at least said item of information received. The insertion module can be implemented by a computer program comprising instructions for inserting the data obtained by the location module, in particular the name of an automatic machine and a communication identifier, into a database. The insertion into the database can be performed by a request conforming to the SQL (Simple Query Language) language configured to insert, into an address book database, the items of information relating to the automatic machine detected nearby.

The device also comprises a module 406 for selecting an entry corresponding to an automatic machine detected nearby in an address book or a list of automatic machines of the terminal. The list or the address book are for example stored in the form of a database of the terminal. The selection module comprises a display suitable for displaying the automatic machines detected and a selection device suitable for selecting a particular entry in the list or the address book. For example, it can be a touch screen associated with the terminal 100.

Finally, the device 400 comprises a communication module 405 suitable for sending at least one message configured to initialize an interaction between the terminal and the communicating automatic machine when the entry in the address book inserted is selected. Such a module can be implemented by a computer program comprising instructions configured to send a first message intended to initiate an interaction with a selected automatic machine, the computer program being run by a processor of the device.

According to a particular embodiment, the device 400 also comprises a confirmation module suitable for exchanging a validation datum with a communicating automatic machine. The confirmation module can comprise a module for displaying a graphic code intended to be read by an optical reading device. For example, the confirmation module can comprise a display suitable for displaying an alphanumeric code, a bar code or a two-dimensional code. According to a particular embodiment, the confirmation module comprises an NFC communication device suitable for sending a validation datum. The confirmation module can also comprise a communication interface suitable for receiving a validation datum sent by a communicating automatic machine.

The device can be incorporated in a terminal, such as a cellphone of smartphone type, a tablet, a watch, a bracelet or any other connected object, or indeed a portable computer.

Although the present disclosure has been described with reference to one or more examples, workers skilled in the art will recognize that changes may be made in form and detail without departing from the scope of the disclosure and/or the appended claims.

The invention claimed is:

1. A method for interaction between a mobile terminal and a communicating automatic machine, the communicating automatic machine comprising a conversational agent configured for automatically responding to messages sent by a mobile terminal through an instant messaging interface, the method being performed by the mobile terminal and comprising:
    obtaining an item of information according to which the communicating automatic machine is in proximity to the mobile terminal,
    upon obtaining this item of information, automatically inserting a new entry relating to said communicating automatic machine into an address book of an instant messaging application of the mobile terminal, conditioned by at least one filtering rule configured previously, this new entry allowing the mobile terminal to communicate with the conversational agent of the automatic machine via the instant messaging application, and
    sending at least one message suitable for initializing an interaction between the mobile terminal and the communicating automatic machine in response to the entry in the address book inserted being selected.

2. The method as claimed in claim 1, wherein interaction between the mobile terminal and the communicating automatic machine is a transaction performed via an instant messaging protocol.

3. The method as claimed in claim 1, further comprising confirming interaction with the communicating automatic machine by an action of a user of the mobile terminal on the communicating automatic machine.

4. The method as claimed in claim 3, wherein the confirming comprises an exchange of a validation datum by optical reading or NFC.

5. The method as claimed in claim 1, wherein the item of information according to which the communicating automatic machine is in proximity to the mobile terminal is obtained by detecting equipment, including the communicating automatic machine, that is within range of a communication interface of the mobile terminal.

6. The method as claimed in claim 1, wherein the item of information according to which the communicating automatic machine is in proximity to the mobile terminal is obtained by receiving a first message sent by the communicating automatic machine, the message being sent when the mobile terminal is within range of a communication interface of the communicating automatic machine.

7. The method as claimed in claim 1, wherein the obtaining of the item of information according to which the communicating automatic machine is in proximity to the mobile terminal provokes a notification on the mobile terminal.

8. A mobile terminal able to interact with a communicating automatic machine, the communicating automatic machine comprising a conversational agent suitable for automatically responding to messages sent by the mobile terminal through an instant messaging interface, the mobile terminal comprising:
 a processor; and
 a non-transitory computer-readable medium comprising instructions stored thereon, which when executed by the processor configure the mobile terminal to perform acts comprising:
 obtaining an item of information according to which the communicating automatic machine is in proximity to the mobile terminal,
 upon obtaining this item of information, automatically inserting a new entry relating to said communicating automatic machine into an address book of an instant messaging application of the mobile terminal, conditioned by at least one filtering rule configured previously, this new entry allowing the mobile terminal to communicate with the conversational agent of the automatic machine via the instant messaging application, and
 sending at least one message suitable for initializing an interaction between the mobile terminal and the communicating automatic machine in response to the entry in the address book inserted being selected.

9. A non-transitory computer-readable information medium on which is stored a computer program comprising instructions for execution of a method for interaction between a mobile terminal and a communicating automatic machine when the instructions are executed by a processor of the mobile terminal, the communicating automatic machine comprising a conversational agent configured for automatically responding messages sent by the mobile terminal through an instant messaging interface, wherein the instructions configure the mobile terminal to perform acts comprising:
 obtaining an item of information according to which the communicating automatic machine is in proximity to the mobile terminal,
 upon obtaining this item of information, automatically inserting a new entry relating to said communicating automatic machine into an address book of an instant messaging application of the mobile terminal, conditioned by at least one filtering rule configured previously this new entry allowing the mobile terminal to communicate with the conversational agent of the automatic machine via the instant messaging application, and
 sending at least one message suitable for initializing an interaction between the mobile terminal and the communicating automatic machine in response to the entry in the address book inserted being selected.

\* \* \* \* \*